(12) United States Patent
Iemura et al.

(10) Patent No.: US 9,312,965 B2
(45) Date of Patent: Apr. 12, 2016

(54) OPTICAL RECEIVER MODULE

(71) Applicant: Oclaro Japan, Inc., Sagamihara, Kanagawa (JP)

(72) Inventors: Koki Iemura, Kanagawa (JP); Takashi Toyonaka, Kanagawa (JP); Hiroshi Hamada, Tokyo (JP)

(73) Assignee: OCLARO JAPAN, INC., Kanagawa (JP)

( * ) Notice: Subject to any disclaimer, the term of this patent is extended or adjusted under 35 U.S.C. 154(b) by 130 days.

(21) Appl. No.: 14/077,530

(22) Filed: Nov. 12, 2013

(65) Prior Publication Data

US 2014/0133871 A1     May 15, 2014

(30) Foreign Application Priority Data

Nov. 12, 2012   (JP) .................................. 2012-248832
Sep. 19, 2013   (JP) .................................. 2013-193706

(51) Int. Cl.
  *G02B 6/36*     (2006.01)
  *H04B 10/67*    (2013.01)
  *G02B 6/42*     (2006.01)
  *H04B 10/60*    (2013.01)

(52) U.S. Cl.
  CPC *H04B 10/67* (2013.01); *G02B 6/42* (2013.01); *G02B 6/4214* (2013.01); *H04B 10/60* (2013.01)

(58) Field of Classification Search
  CPC .... H04B 10/60; H04B 10/615; H04B 10/691; H04B 10/67; G02B 6/4214; G02B 6/32; G02B 6/4204; G02B 6/42; G02B 6/43; G02B 6/4215; H04J 14/02; H01L 31/0232

USPC .................. 385/14, 33, 49, 88, 93, 129, 130; 398/88, 128, 135, 138–140, 153, 212, 398/214
See application file for complete search history.

(56) References Cited

U.S. PATENT DOCUMENTS

2010/0209103 A1*   8/2010   Sakigawa et al. ............... 398/45
2011/0299808 A1*  12/2011   Matsuoka et al. ............... 385/14
2012/0263416 A1*  10/2012   Morioka ........................ 385/33

FOREIGN PATENT DOCUMENTS

EP   0 552 792 A1    7/1993
JP   05-224101 A     9/1993

\* cited by examiner

*Primary Examiner* — Kaveh C Kianni
*Assistant Examiner* — Hung Lam
(74) *Attorney, Agent, or Firm* — Mattingly & Malur, PC

(57) ABSTRACT

An optical receiver module capable of increasing the range in which the error in distance between a collecting lens and a light receiving section is allowed is provided. In the optical receiver module according to the invention, the optical receiver includes a semiconductor substrate to which the light from the collecting lens is input, and through which the light passes, and a light receiving section disposed on a side (a reverse side) of the semiconductor substrate, the side being further from the collecting lens, and adapted to receive the light transmitted through the semiconductor substrate, and then convert the light into an electrical signal. On a side (an obverse side) of the semiconductor substrate, the side being nearer to the collecting lens, there is formed a lens surface adapted to converge light from the collecting lens toward the light receiving section.

6 Claims, 4 Drawing Sheets

OPTICAL RECEIVER MODULE

CROSS-REFERENCE TO RELATED APPLICATION

The present application claims priority from Japanese application JP2012-248832 filed on Nov. 12, 2012 and Japanese application JP2013-193706 filed on Sep. 19, 2013, the contents of which are hereby incorporated by reference into this application.

BACKGROUND OF THE INVENTION

1. Field of the Invention

The present invention relates to an optical receiver module, and in particular to a technology of collecting light toward a light receiving section.

2. Description of the Related Art

In general, the optical receiver module used for optical communication or the like is provided with a collecting lens, and a light receiving section for receiving the light collected by the collection lens (see JP 5-224101 A).

SUMMARY OF THE INVENTION

Incidentally, in the optical receiver module of the related art, in the case in which an error occurs in the distance between the collecting lens and the light receiving section, there may be the case in which a spot radius of the light received by the light receiving section deviates from a desired value.

The present invention is made in view of the circumstances described above, and has a principal object of providing an optical receiver module capable of enhancing an allowable range of the error in the distance between the collecting lens and the light receiving section.

In order to solve the problem described above, an optical receiver module according to the invention includes a collecting lens, and an optical receiver adapted to receive light from the collecting lens. The optical receiver includes a semiconductor substrate to which the light from the collecting lens is input, and through which the light passes, and a light receiving section, which is disposed on a further side of the semiconductor substrate from the collecting lens, adapted to receive the light having passed through the semiconductor substrate, and then converts the light into an electrical signal. A lens surface adapted to converge the light from the collecting lens toward the light receiving section is formed on a nearer side of the semiconductor substrate from the collecting lens.

Further, an optical receiver module according to the invention includes a lens array having a plurality of collecting lenses arranged, and an optical receiver array having a plurality of optical receivers arranged and adapted to respectively receive light from the plurality of collecting lenses. Each of the plurality of optical receivers include a semiconductor substrate to which the light from the collecting lens is input, and through which the light passes, and a light receiving section, which is disposed on a further side of the semiconductor substrate from the collecting lens, adapted to receive the light having passed through the semiconductor substrate, and then converts the light into an electrical signal. A lens surface adapted to converge the light from the collecting lens toward the light receiving section is formed on a nearer side of the semiconductor substrate from the collecting lens.

Further, in an aspect of the optical receiver module according to the invention, each focal point of light output from the collecting lens, and reaching the light receiving section via the semiconductor substrate is separate from a light receiving surface of the light receiving section in an optical axis direction of the light.

Further, in an aspect of the optical receiver module according to the invention, the each focal point of the light output from the collecting lens, and reaching the light receiving section via the semiconductor substrate is located inside the semiconductor substrate and between the lens surface and the light receiving section.

Further, in an aspect of the optical receiver module according to the invention, there is further included a light branching circuit adapted to branch a light input into a plurality of light having respective wavelengths different from each other, and then emit the light respectively to the plurality of collecting lenses, and each focal point of the light output from the collecting lens, and reaching the light receiving section via the semiconductor substrate is located inside the semiconductor substrate and between the lens surface and the light receiving section.

Further, in an aspect of the optical receiver module according to the invention, there are further included an optical fiber, and a collimating lens adapted to convert light emitted from the optical fiber into parallel light, and the parallel light is the light having been input, and the light branching circuit branches the parallel light into a plurality of light having respective wavelengths different from each other, and then emit the light respectively to the plurality of collecting lenses.

According to the invention, since the light receiving section is disposed on the side of the semiconductor substrate further from the collecting lens, and the lens surface is formed on the side nearer to the collecting lens, the light collected by the collecting lens is further converged by the lens surface formed in the anterior stage of the light receiving section. Therefore, even in the case in which, for example, an error occurs in the distance between the collecting lens and the optical receiver so as to increase the spot radius of the light received in the light receiving section, since the lens surface is formed in the anterior stage of the light receiving section, it is possible to inhibit the spot radius from deviating from the desired size. Therefore, according to the invention, it is possible to increase the allowable range of the error in the distance between the collecting lens and the light receiving section.

DETAILED DESCRIPTION OF THE INVENTION

An embodiment of the optical receiver module according to the invention will be explained with reference to the accompanying drawings.

Figure 1:
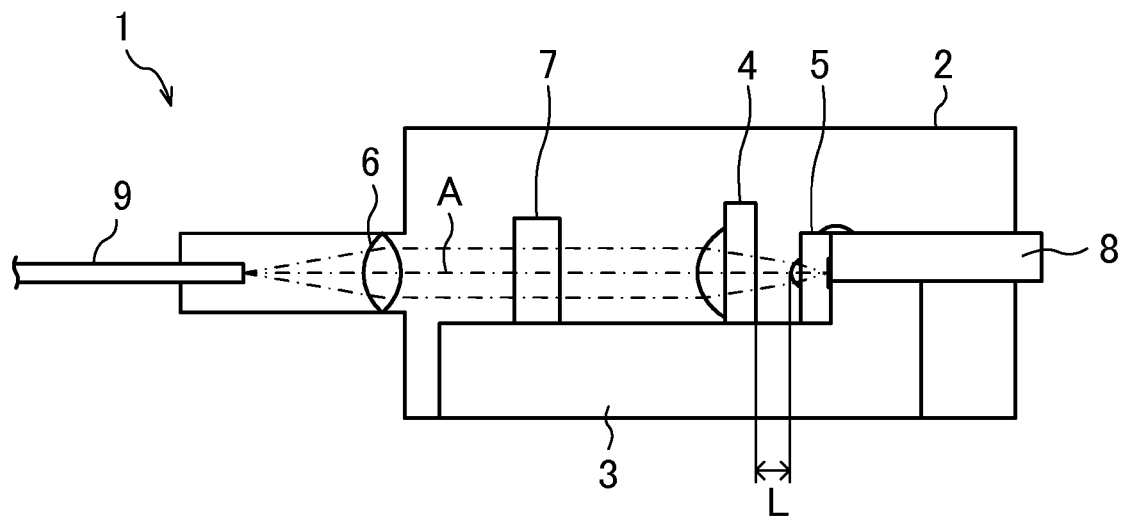
FIG. 1 is a diagram schematically showing a configuration example of an optical receiver module according to the invention.

FIG. 1 is a diagram schematically showing a configuration example of the optical receiver module (the light receiving module) according to the invention. An optical receiver module 1 shown in the drawing is an optical receiver module used for, for example, optical communication. The optical receiver module 1 is provided with a housing 2 having a roughly box-like shape, and a support substrate 3 is disposed inside the housing 2. To the support substrate 3, there are attached a collecting lens 4, an optical receiver (light receiver) 5, an optical component 7, and a circuit board 8. Further, a collimating lens 6 is disposed inside the housing 2.

The collimating lens 6, the optical component 7, the collecting lens 4, and the optical receiver 5 are arranged in this order along an optical axis A of the light input from an optical fiber 9 to the inside of the housing 2. The optical component 7 is, for example, a mirror or a filter. The light input from the optical fiber 9 to the inside of the housing 2 is converted by the collimating lens 6 into parallel light, then passing through the optical component 7, then converged by the collecting lens 4, and then received by the optical receiver 5.

The optical receiver 5 includes a light receiving section for converting the light received into an electrical signal (the details will be described later), and outputs the electrical signal thus converted to the circuit board 8.

Figure 2:
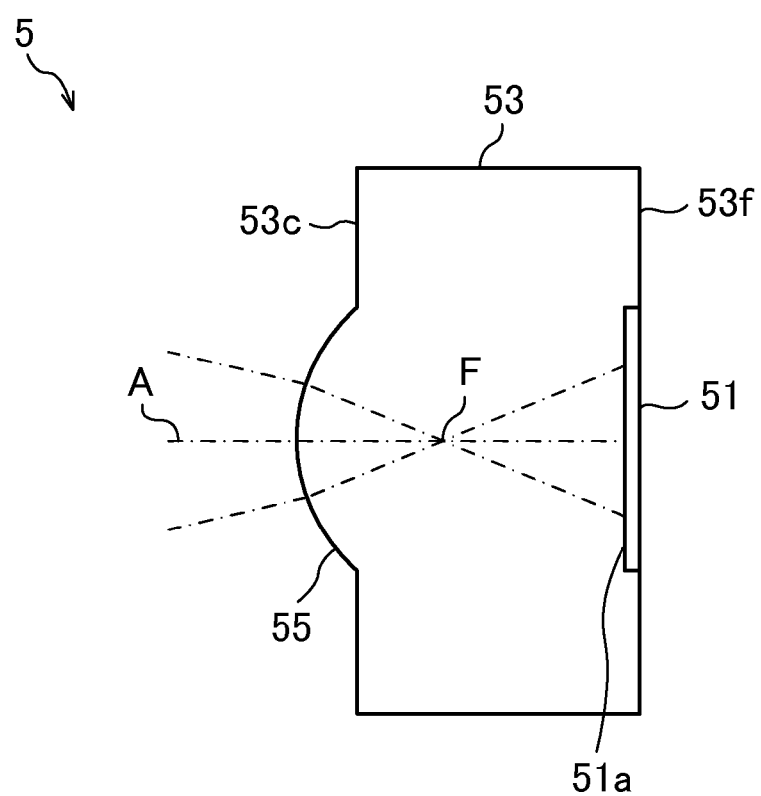
FIG. 2 is a diagram schematically showing a configuration example of an optical receiver included in the optical receiver module.

FIG. 2 is a diagram schematically showing a configuration example of the optical receiver 5 included in the optical receiver module. The optical receiver 5 shown in the drawing is a rear incident photo-diode, has a light receiving section 51 formed on a first surface side of a semiconductor substrate 53, and converts the incident light, which has been input from the collecting lens 4 described above, into the electrical signal. In the present embodiment, the wavelength of the incident light is in 1.3 μm band or 1.55 μm band, and the semiconductor substrate 53 is an InP having a sufficient transmissive character with respect to such wavelength bands.

Here, it is assumed that among surfaces of the semiconductor substrate 53, the surface on the side near to the collecting lens 4 is a reverse side 53c, and the surface on the side far from the collecting lens 4 is an obverse side 53f. Further, it is assumed that among surfaces of the light receiving section 51, the surface facing to the collecting lens 4 is a light receiving surface 51a.

On the reverse surface 53c of the semiconductor substrate 53, there is formed a lens surface 55 having a spherical shape protruding toward the collecting lens 4. For example, the lens surface 55 is formed by selectively etching the reverse surface 53c of the semiconductor substrate 53. Besides the above, it is also possible to, for example, separately form a lens on the reverse surface 53c of the semiconductor substrate 53. The light, which has been input from the collecting lens 4, is input from the lens surface 55 to the inside of the semiconductor substrate 53, and at the same time further converged toward the light receiving section 51 by the lens surface 55.

It should be noted that in the present specification, the phrase "the lens surface 55 converges the light, which has been input from the collecting lens 4, towards the light receiving section 51" only requires the fact that an angle formed between the direction of the light proceeding from the lens surface 55 to the light receiving surface 51a and the optical axis A is larger than an angle formed between the direction of the light proceeding from the collecting lens 4 to the lens surface 55 and the optical axis A (except the light on the optical axis A), and is not limited to the case in which a focal point F is located on the light receiving surface 51a.

Further, although the collecting state of the light is explained here using the expression of "focal point," the "beam waist," which is a point where the light beam is converged the most, has roughly the same meaning, and therefore, if it is considered using the "position of the beam waist" instead of the "position of the focal point," the concept of the invention does not change.

Incidentally, in the case in which the focal point F is located on the light receiving surface 51a, there is a possibility that the problem of the space-charge effect arises. When charges (electron-hole pairs) occur at a high density locally inside the depletion layer of the light receiving section 51, the electrons are accumulated densely on the P-type electrode side inside the depletion layer, and the holes are accumulated densely on the N-type electrode side inside the depletion layer, and therefore, an internal electrical field due to the both parties occurs. This electrical field has a direction reverse to the direction of a normal electrical field applied to the inside of the depletion layer by an external bias voltage, therefore cancels and weakens the normal electrical field intensity. Thus, the running time of the charges is elongated, and the high-frequency characteristics are deteriorated in some cases. The phenomenon described hereinabove is the space-charge effect. Such a space-charge effect becomes more conspicuous as the communication rate rises (e.g., 25 Gbit/s or higher).

Therefore, in the case in which there is a possibility that the problem of the space-charge effect arises, it is possible to shift the focal point F of the light, which is output from the collecting lens 4 and reaches the light receiving section 51 through the semiconductor substrate 53, from the light receiving surface 51a of the light receiving section 51 toward the lens surface 55 (i.e., the light can be defocused) as shown in FIG. 2 described above. Thus, since the spot radius of the light received in the light receiving surface 51a becomes relatively large, the space-charge effect can be suppressed. The defocus can be realized by, for example, controlling the thickness of the semiconductor substrate 53.

More specifically, the focal point F of the light output from the collecting lens 4 and reaching the light receiving section 51 through the semiconductor substrate 53 can be located, for example, inside the semiconductor substrate 53 as shown in FIG. 2, on the side nearer to the collecting lens 4 than the semiconductor substrate 53, or on the side further from the collecting lens 4 than the semiconductor substrate 53.

Figure 3:
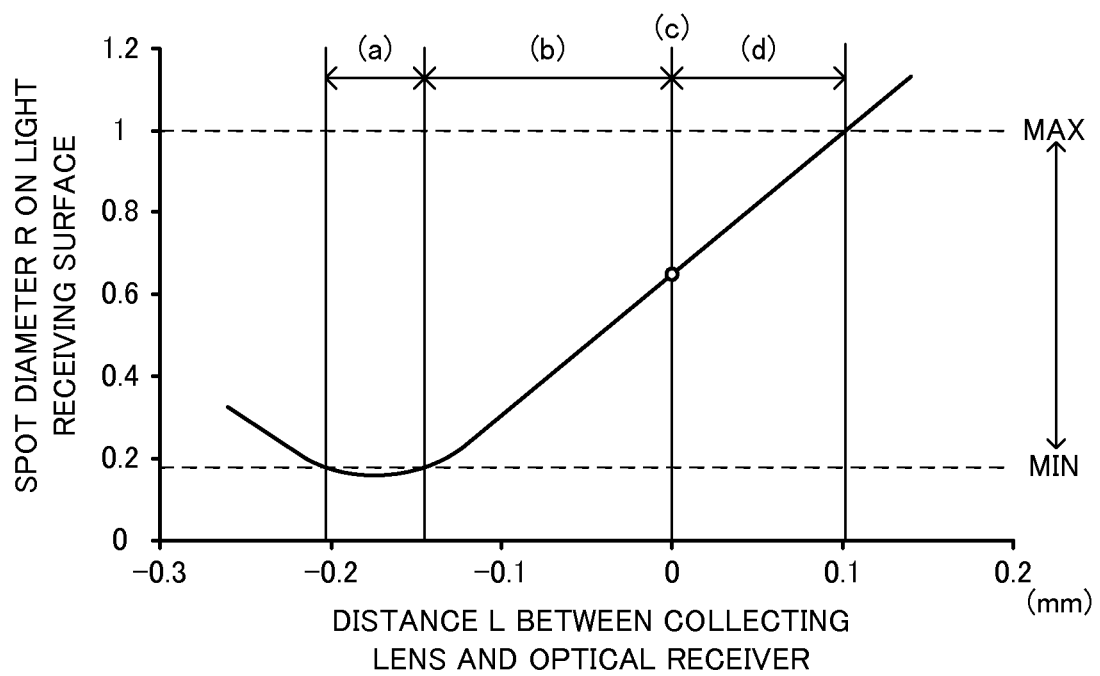
FIG. 3 is a diagram for explaining a relationship between a distance L between the collecting lens and the optical receiver, and a spot radius R on the light receiving surface.

FIG. 3 is a diagram for explaining a relationship between a distance L between the collecting lens 4 and the optical receiver 5, and a spot radius R on the light receiving surface 51a. FIGS. 4A through 4D are diagrams for explaining states of the light collection in accordance with the distance L shown in FIG. 3.

The horizontal axis of the graph shown in FIG. 3 represents the distance L between the collecting lens 4 and the optical receiver 5, and represents an amount of increase or decrease of the focal point F of the light by the collecting lens 4 when shifting the focal point F in a direction along the optical axis A from the position located on the lens surface 55 assuming that the amount of increase or decrease in the case in which the focal point F is located on the lens surface 55 is 0. The ranges (a) through (d) of the distance L shown in FIG. 3 correspond respectively to FIGS. 4A through 4D. The vertical axis of the graph shown in FIG. 3 represents the spot radius R on the light receiving surface 51a, and is normalized assuming that the maximum value MAX in the desired range is 1. For example, the maximum value MAX in the desired range is determined based on the size of the light receiving surface 51a, and the minimum value MIN is determined so as to avoid the problem of the space-charge effect.

As a specific example, assuming that the effective light receiving radius of the typical photo-diode for 25 Gb/s is 8.0 μm, for example, the spot radius R of the maximum value MAX in the desired range is roughly the same as the effective light receiving radius. Further, the spot radius R of the minimum value MIN in the desired range is determined, for example, so that the problem of the space-charge effect does not arise, and is in the range of about 2 through 3 μm, although depending on the performance of the photo-diode.

Figure 4A:
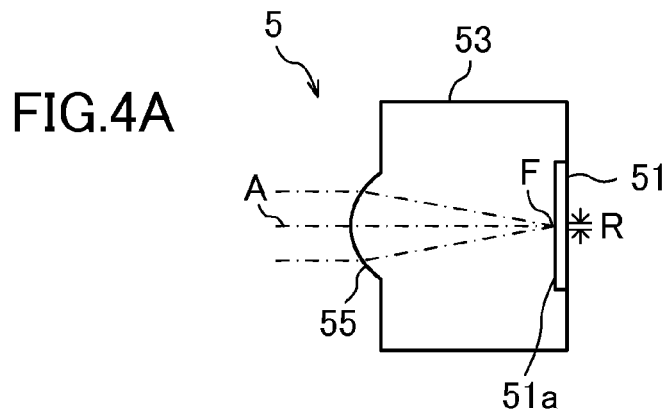
FIGS. 4A through 4D are diagrams for explaining states of the light collection in accordance with the distance L shown in FIG. 3.

The range (a) of the distance L in FIG. 3 shows the case in which the spot radius R on the light receiving surface 51a is smaller than the minimum value MIN in the desired range. In this case, as shown in FIG. 4A, the focal point F is located on or in the vicinity of the light receiving surface 51a of the light receiving section 51. In the case in which the spot radius R on the light receiving surface 51a is smaller than the minimum value MIN in the desired range, there is a possibility that the problem of the space-charge effect arises as described above.

The ranges (b) through (d) of the distance L in FIG. 3 each show the case in which the spot radius R on the light receiving surface 51a is included in the desired range (between the maximum value MAX and the minimum value MIN).

Figure 4B:
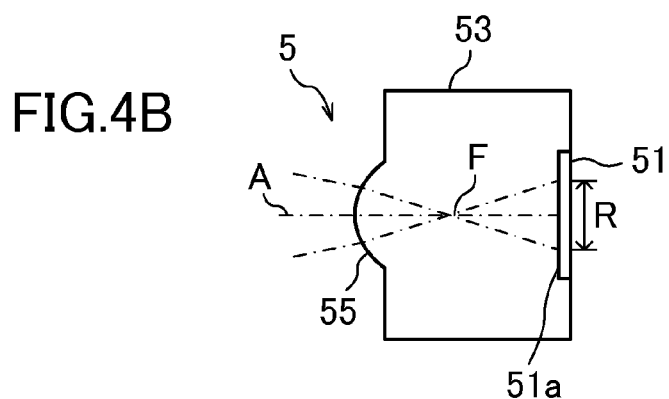

Among these ranges, in the range (b), the focal point F is located inside the semiconductor substrate 53 as shown in FIG. 4B. In this case, the light from the collecting lens 4 enters the lens surface 55 in the state of being narrowed down in the direction of approaching the optical axis A. The light having entered the inside of the semiconductor substrate 53 through the lens surface 55 is focused at the focal point F between the lens surface 55 and the light receiving surface 51a, then spreads away from the optical axis A, and then reaches the light receiving surface 51a.

Figure 4C:
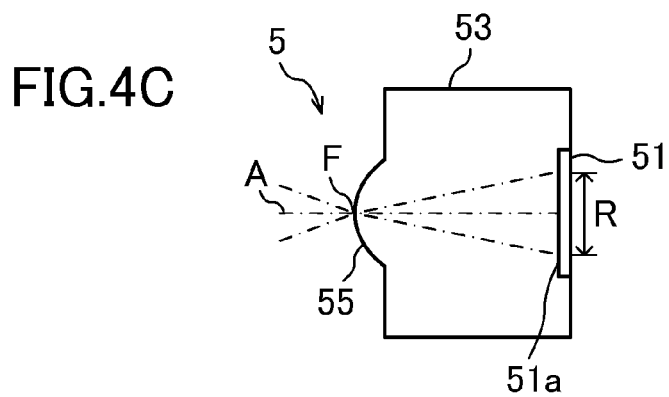

Further, in the range (c), the focal point F is located on the lens surface 55 of the semiconductor substrate 53 as shown in FIG. 4C. In this case, the light having been narrowed down in the direction of approaching the optical axis A by the collecting lens 4 enters the lens surface 55 in the state of being focused at the focal point F on the lens surface 55. The light having entered the inside of the semiconductor substrate 53 through the lens surface 55 reaches the light receiving surface 51a spreading away from the optical axis A.

Figure 4D:
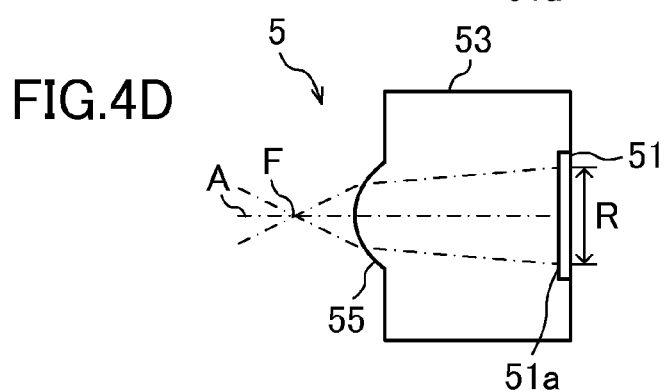

Further, in the range (d), the focal point F is located between the collecting lens 4 and the semiconductor substrate 53 as shown in FIG. 4D. In this case, the light from the collecting lens 4 is focused at the focal point F between the collecting lens 4 and the lens surface 55, and then enters the lens surface 55 in the state of spreading away from the optical axis A. The light having entered the inside of the semiconductor substrate 53 through the lens surface 55 reaches the light receiving surface 51a with the spread slightly suppressed compared to that before the entrance.

Among the ranges (b) and (d) explained hereinabove, the range (b) is more preferable. In the range (b), the light from the collecting lens 4 enters the lens surface 55 in the state being narrowed down in the direction of approaching the optical axis A, while in the range (d), the light from the collecting lens 4 enters the lens surface 55 in the state of spreading away from the optical axis A. Therefore, the incident angle (an acute angle formed between the light beam and the normal line of the lens surface 55) of the light in the range (d) becomes larger than the incident angle of the light in the range (b). There is a possibility that the larger the incident angle of the light with respect to the lens surface 55 becomes, the higher the proportion of the light, which fails to be sufficiently converged by the lens surface 55 to fall within the light receiving surface 51a, becomes.

Further, in the range (d), if the distance L between the collecting lens 4 and the optical receiver 5 increases, there is a possibility that the spot radius R on the light receiving surface 51a exceeds the maximum value MAX in the desired range. In other words, if the distance L between the collecting lens 4 and the optical receiver 5 increases, there is a possibility that a circumferential part of the light having entered the lens surface 55 fails to fall within the light receiving surface 51a. Therefore, it can be said that the range (b) in which the focal point F is located inside the semiconductor substrate 53 has a broader allowable range of error with respect to the displacement in the direction along the optical axis A compared to the range (d) in which the focal point F is located between the collecting lens 4 and the semiconductor substrate 53.

Further, in the range (c), although the focal point F is located on the lens surface 55, in this case, there is a possibility that, for example, reflection occurs on the lens surface 55 to cause noise to deteriorate the light reception sensitivity. Therefore, it is preferable to shift the focal point F from the lens surface 55 in a direction along the optical axis A.

It should be noted that the focal point F can be located on the side further from the collecting lens 4 than the semiconductor substrate 53 (i.e., it is possible for the focal point F to be located on the right side of the light receiving section 51 shown in FIGS. 4A though 4D. It should be noted that if the distance L between the collecting lens 4 and the optical receiver 5 decreases, there is a possibility that the radius of the light to be input to the lens surface 55 exceeds the effective range of the lens surface 55. In particular in the lens surface 55 formed by etching or the like, since the longer the distance from the center is, the more easily the shape differs from the ideal curve, the radius of the light entering the lens surface 55 is the smaller the better. Therefore, it can be said that the range (b) in which the focal point F is located inside the semiconductor substrate 53 has a broader allowable range of the error in the direction along the optical axis A compared to the case in which the focal point F is located on the side further from the collecting lens 4 than the semiconductor substrate 53.

As described hereinabove, by adopting the range (b) in which the focal point F is located inside the semiconductor substrate 53, it is possible to reduce the possibility that the distance between the collecting lens and the light receiving section varies due to the variation in the mounting position and so on to thereby make the spot radius of the light to be received differ from the desired size, and thus the optical receiver module capable of stably obtaining the desired spot radius can be provided.

Figure 5:
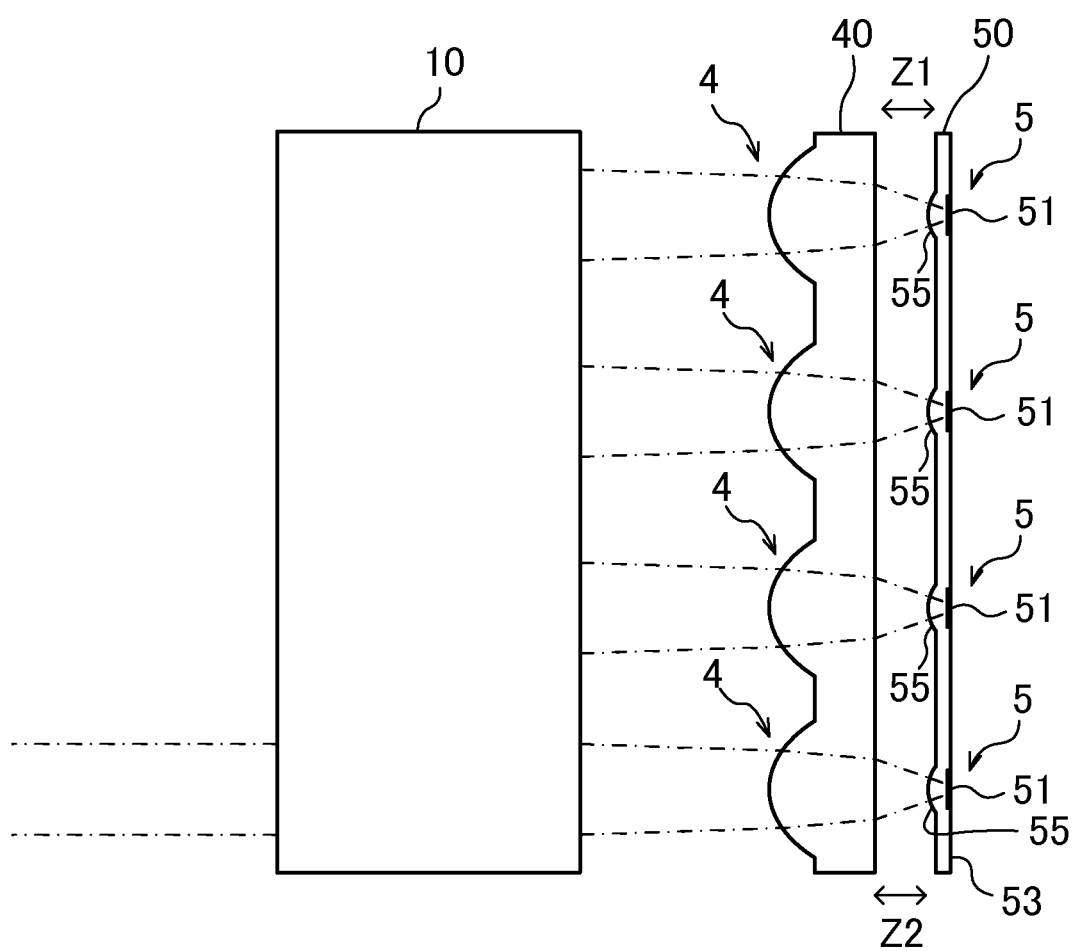
FIG. 5 is a diagram schematically showing another configuration example of the optical receiver module according to the invention.

FIG. 5 is a diagram schematically showing another configuration example of the optical receiver module according to the invention. The point in which the present example is different from the example described above is the point that the optical receiver module 1 according to the present example includes a plurality of sets of the collecting lens 4 and the optical receiver 5. Specifically, the optical receiver module 1 according to the present example is provided with a light branching circuit 10, a lens array 40 including the plurality of collecting lenses arranged, and an optical receiver array 50 including the plurality of optical receivers 5 arranged.

The light (see FIG. 1) having been converted by the collimating lens 6 described above into the parallel light enters the light branching circuit 10. The light used in the present example includes a plurality of components different in wavelength from each other. The light branching circuit 10 branches the incident light into a plurality of light different in wavelength from each other, and then emits the plurality of light to the plurality of collecting lenses 4 included in the lens array 40. The light branching circuit 10 can be a spatial optical light branching circuit, or can be a PLC light branching circuit.

The plurality of collecting lenses 4 included in the lens array 40 converge the light, which are output from the light branching circuit 10, toward the plurality of optical receivers 5 included in the optical receiver array 50, respectively. The plurality of collecting lenses 4 are separated from each other in an in-plane direction of a plane perpendicular to the optical axis A, and for example, arranged in a line in the in-plane direction as shown in FIG. 5. Further, plurality of the optical receivers 5 are also arranged similarly to the plurality of collecting lenses 4.

Incidentally, in the case in which the lens array 40 and the optical receiver array 50 are disposed as in the case of the present example, there is a possibility of generating an error in parallelism between the both parties (i.e., there is a possibility that distances Z1, Z2 at the both ends are different from each other), and the distances between the collecting lenses 4 and the optical receivers 5 are easily different from each other. Hereinafter, the specific explanation will be presented. In the case of disposing a single collecting lens 4 and a single light receiver 5 which are not arrays, it is easy to dispose the collecting lens 4 and the optical receiver 5 so that the focal point F is located at the desired position. However, in the case of the arrays, assuming that the arrays are arranged so that, for example, the focal point F is located at the desired position in the lowest one of the sets of the collecting lenses 4 and the optical receivers 5 shown in FIG. 5 (assuming that the arrays are arranged so that the distance Z2 is the desired distance), there might be the case in which either one or both of the lens array 40 and the optical receiver array 50 are tilted due to the variation in the mounting positions of the lens array 40 and the optical receiver array, and the lens array 40 and the optical receiver array 50 are disposed in the state in which the distances Z1, Z2 are different from each other. On this occasion, it results that the position of the focal point F of the highest one of the sets of the collecting lenses 4 and the optical receivers 5 shown in FIG. 5 is disposed so as to be shifted from the desired position. In the case in which the lens array 40 and the optical receiver array 50 are arranged so that the focal position F of the lowest one of the sets of the collecting lenses 4 and the optical receivers 5 is located in the range of (d) shown in FIGS. 3 and 4D, and Z1>Z2 is satisfied, there is a possibility that the position of the focal point F of the highest one of the sets of the collecting lenses 4 and the optical receivers 5 makes the spot radius R on the light receiving surface 51a exceed the maximum value MAX of the spot radius R.

However, as described above, by arranging the position of the focal point F of the lowest one of the sets of the collecting lenses 4 and the optical receivers 5 in the range (b) shown in FIGS. 3 and 4B, since it is possible to increase the allowable range of error with respect to the direction along the optical axis A, the possibility that the spot radius R on the light receiving surface exceeds the maximum value MAX and the minimum value MIN can be reduced even if the error occurs in the parallelism between the lens array 40 and the optical receiver array 50 to thereby cause the variation in the distances between the collecting lenses 4 and the optical receivers 5.

As described hereinabove, by setting the distance between the lens array 40 and the optical receiver array 50 and the thickness (the distance between the lens surface 55 and the light receiving section 51) of the semiconductor substrate 53 so that the focal point F is located inside the semiconductor substrate 53 as shown in FIG. 4B in each of the sets of the collecting lenses 4 and the optical receivers 5, it is possible to make the spot radius R on the light receiving surface 51a fall within the desired range in each of the sets of the plurality of collecting lenses 4 and the plurality of optical receivers 5. Therefore, according to the present embodiment, a particularly effective advantage can be obtained in such an array type light receiving module as receiving a plurality of light with the respective wavelengths.

Although the embodiment of the invention is explained hereinabove, the invention is not limited to the embodiment described above, but it is obvious that it is possible for those skilled in the art to put the invention into practice with a variety of modifications.

For example, it is also possible for the optical receiver array to have a plurality of light receiving sections integrated on the same semiconductor substrate, or to have a plurality of optical receivers mounted on the same sub-mount.

Further, as the optical receiver, instead of the rear incident photo-diode having the light receiving section formed on the semiconductor substrate, it is also possible to adopt a configuration in which a photo-diode is mounted on a semiconductor substrate capable of sufficiently transmitting the incident light, and a lens surface is disposed on the side of the surface on which the photo-diode is not mounted.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical receiver module comprising:
a collecting lens; and
an optical receiver adapted to receive light from the collecting lens,
wherein the optical receiver includes
a semiconductor substrate to which the light from the collecting lens is input, and through which the light passes, and
a light receiving section, which is disposed on a further side of the semiconductor substrate from the collecting lens, adapted to receive the light having passed through the semiconductor substrate, and then converts the light into an electrical signal, and
a lens surface adapted to converge the light from the collecting lens toward the light receiving section is formed on a nearer side of the semiconductor substrate from the collecting lens,
wherein a focal point, of the light output from the collecting lens and reaching the light receiving section via the semiconductor substrate, is located inside the semiconductor substrate and between the lens surface and the light receiving section.

2. An optical receiver module comprising:
a lens array having a plurality of collecting lenses arranged; and
an optical receiver array having a plurality of optical receivers arranged and adapted to respectively receive light from the plurality of collecting lenses,
wherein each of the plurality of optical receivers includes
a semiconductor substrate to which the light from the collecting lenses is input, and through which the light passes, and
a light receiving section, which is disposed on a further side of the semiconductor substrate from the collecting lens, adapted to receive the light having passed through the semiconductor substrate, and then converts the light into an electrical signal, and a lens surface adapted to converge the light from the collecting lenses toward the light receiving section is formed on a nearer side of the semiconductor substrate from the collecting lenses, wherein each focal point, of the light output from the collecting lenses and reaching the light receiving section via the semiconductor substrate, is located inside the semiconductor substrate and between the lens surface and the light receiving section.

3. The optical receiver module according to claim 2, further comprising:

a light branching circuit adapted to branch a light having been input into a plurality of light having respective wavelengths different from each other, and then emit the light respectively to the plurality of collecting lenses.

4. The optical receiver module according to claim 3, further comprising:

an optical fiber; and a collimating lens adapted to convert light emitted from the optical fiber into parallel light, wherein the parallel light is the light having been input, and the light branching circuit branches the parallel light into a plurality of light having respective wavelengths different from each other, and then emit the light respectively to the plurality of collecting lenses.

5. An optical receiver module comprising:

a first collecting lens;

a second collecting lens adapted to converge light from the first collecting lens; and an optical receiver adapted to receive light from the second collecting lens, wherein the optical receiver includes a semiconductor substrate to which the light from the second collecting lens is input, and through which the light passes, and a light receiving section, which is disposed on a further side of the semiconductor substrate from the second collecting lens, adapted to receive the light having passed through the semiconductor substrate, and then converts the light into an electrical signal, and a lens surface adapted to converge the light from the second collecting lens toward the light receiving section is formed on a nearer side of the semiconductor substrate from the second collecting lens, wherein a focal point, of the light output from the second collecting lens and reaching the light receiving section via the semiconductor substrate, is located inside the semiconductor substrate and between the lens surface and the light receiving section.

6. An optical receiver module comprising:

a first lens array having a plurality of first collecting lenses arranged;

a second lens array having a plurality of second collecting lenses arranged and adapted to respectively converge light from the plurality of first collecting lenses; and an optical receiver array having a plurality of optical receivers arranged and adapted to respectively receive light from the plurality of second collecting lenses, wherein each of the plurality of optical receivers includes a semiconductor substrate to which the light from the second collecting lenses is input, and through which the light passes, and a light receiving section, which is disposed on a further side of the semiconductor substrate from the second collecting lenses, adapted to receive the light having passed through the semiconductor substrate, and then converts the light into an electrical signal, and a lens surface adapted to converge the light from the second collecting lenses toward the light receiving section is formed on a nearer side of the semiconductor substrate from the second collecting lenses, wherein each focal point, of the light output from the second collecting lenses and reaching the light receiving section via the semiconductor substrate, is located inside the semiconductor substrate and between the lens surface and the light receiving section.

\* \* \* \* \*